(12) United States Patent
Livermore et al.

(10) Patent No.: US 7,904,383 B2
(45) Date of Patent: Mar. 8, 2011

(54) METHOD AND SYSTEM FOR MONITORING FOR AND REPORTING OF LIEN DISTRESS EVENTS

(75) Inventors: George S. Livermore, Santa Ana, CA (US); Dianna L. Serio, Irvine, CA (US); Charles E. Crawford, Jr., Plantation, FL (US); Reid Lange, Sanger, TX (US); Michelle Pinnix, El Cajon, CA (US)

(73) Assignee: CoreLogic Information Solutions, Inc., Santa Ana, CA (US)

( * ) Notice: Subject to any disclaimer, the term of this patent is extended or adjusted under 35 U.S.C. 154(b) by 0 days.

(21) Appl. No.: 12/783,093

(22) Filed: May 19, 2010

(65) Prior Publication Data

US 2010/0274737 A1     Oct. 28, 2010

Related U.S. Application Data

(63) Continuation of application No. 11/499,401, filed on Aug. 4, 2006, now Pat. No. 7,747,520.

(60) Provisional application No. 60/705,936, filed on Aug. 5, 2005.

(51) Int. Cl.
    *G06Q 40/00* (2006.01)
(52) U.S. Cl. ............... 705/38; 705/35; 705/11; 235/375
(58) Field of Classification Search ............ 705/35, 705/38, 11; 235/375
    See application file for complete search history.

(56) References Cited

U.S. PATENT DOCUMENTS

| | | | |
|---|---|---|---|
| 6,484,176 B1 | 11/2002 | Sealand et al. | |
| 6,633,875 B2 | 10/2003 | Brady | |
| 7,287,008 B1 | 10/2007 | Mahoney et al. | |
| 2003/0144948 A1 | 7/2003 | Cleary et al. | |
| 2005/0154664 A1 | 7/2005 | Guy et al. | |
| 2008/0281649 A1 | 11/2008 | Morris | |

OTHER PUBLICATIONS

Jay Romano, Your Home: Holding a House Hostage, New York Times, Aug. 22, 1999 (Hostage).*
KnowX Website simplifies Access to Business Records, BusinessWire, Apr. 14, 1998 (KnowX).*
Haarlander, Lisa; "Stovroff Offers New Services to Home Buyers, Sellers"; *Buffalo News*, 2 pages, Jul. 17, 2001.
www.stovroff.com; 2 pages.
"Six Florida Realtor Organizations Sign Multi-Year Agreements with Interealty; 30,000 Realtors Statewide to Be Offered MLXchange, the Leading MLS Software System"; *Business Wire*; 2 pages; Oct. 2, 2002.
MLXchange Training Guide Version 1.4; 114 pages; Sep. 5, 2003.
Block, Sandra; "Guard Your Financial Info Doggedly"; *USA Today*; 2 pages; Jun. 30, 2005.
"Trilegiant & MyPublicInfo Announce Partnership To Offer ID Theft Prevention Serevice"; *PR Newswire*; 2 pages; Oct. 12, 2005.
Kandra, Anne; "Browing for Housing-AStep-By-Step Guide to Buying a Home on the Web"; *PC World*; 7 pages; Apr. 1999.

(Continued)

*Primary Examiner* — Ella Colbert
*Assistant Examiner* — Chika Ojiaku
(74) *Attorney, Agent, or Firm* — Snell & Wilmer L.L.P.

(57) ABSTRACT

A computer-based method of monitoring for and reporting of a lien distress event relatable to a lien against a property includes the steps of extracting loan data from a client loan portfolio, defining the lien distress event relatable to the loan data by using one or more lien distress event criterion, detecting an occurrence of the lien distress event iteratively, and notifying a client of the occurrence of the lien distress event.

22 Claims, 4 Drawing Sheets

OTHER PUBLICATIONS

Razzi, Elizabeth et al.; "www.$$$.com"; *Kiplinger's Personal Finance Magazine*; 3 pages; Oct. 1996.
Antoniak, Michael; "Manage Your Customer List"; *Realtor Magazine*; pp. 48-51; Mar. 2001.
Antoniak, Michael; "Take It Online"; *Realtors Magazine*; pp. 30-31; Jun. 2003.
Richard, Dan Gooder; "Real Estate Rainmaker Guide to Online Marketing"; 7 pages; 2004.
Simpson, Glenn R.; "Big Brother-in-Law: If the FBI Hopes to Get the Goods on You, It May Ask ChoicePoint-U.S. Agencies' Growing Use of Outside Data Suppliers Raises Privacy Concerns-A Fugitive Rents a Mailbox"; Wall Street Journal; 6 pages; Apr. 12, 2001.
Luna, J.J.; "How to Be Invisible"; 15 pages; 2000.
Simpson, Burney; "An Unlikely Hit: Credit Scores" Credit Card Management; 3 pages; Apr. 2002.

* cited by examiner

METHOD AND SYSTEM FOR MONITORING FOR AND REPORTING OF LIEN DISTRESS EVENTS

CLAIM OF PRIORITY UNDER 35 U.S.C. §120

This application is a continuation of U.S. patent application Ser. No. 11/499,401, entitled "METHOD AND SYSTEM FOR MONITORING FOR AND REPORTING OF LIEN DISTRESS EVENTS," filed Aug. 4, 2006, now U.S. Pat. No. 7,747,520, which claims the benefit of U.S. provisional patent application No. 60/705,936, filed Aug. 5, 2005. The entire disclosures of each of these applications are incorporated herein by reference.

FIELD

The present invention relates to real estate loans on properties and more particularly to a method and system for monitoring loans on real property and the liens associated with those loans, determining when a lien distress event has occurred, and reporting notice of that event along with additional data pertaining to the property to the lender.

BACKGROUND

When purchasing real property, purchasers often require or desire to use financing. During this process, the lender often acquires a lien on the property. Liens, usually in one of two forms, enable the lender in the case of default on repayment of the loan, to either take possession and then sell the property in order to repay the loan amount or to force a sale of the property with first rights to the proceeds of the sale up to the amount owed on the loan. In either case, this right is referred to as a lien.

There are also varying degrees of liens. The first or primary lender on the property has a first lien or a first position. A second mortgagee has a second lien or a second position. Subsequent liens are prioritized according to a tertiary position, usually in order of recordation. A lender higher in priority is a senior lender with respect to a lender lower in priority. A lender lower in priority is a junior lender with respect to a lender higher in priority.

When a sale of a property is made or forced pursuant to the rights of one lender's lien, other lenders having liens on the same property have a right of repayment in the specified order of priority. So, for example, a second loan may be taken out on a property in order to make home improvements on the property, and the corresponding secondary lender may place a secondary lien on the property. In this case, the first mortgage lien has first position and the second mortgage lien has second position. If either loan defaults, the property may be sold and the first loan would be paid off prior to the second loan. Any remainder would be used to pay down the second loan, any remainder thereafter would pay off tertiary positions, and any final remainder would be returned to the mortgagor.

Second and tertiary position lien holders (hereinafter secondary position lenders or secondary position lien holders) are often not as well-equipped to handle potential defaults as a first position lien holder. Secondary position lenders may have limited monitoring resources, or may roll their individual loans into a larger portfolio of loans, which makes monitoring the loans individually more complicated and time-consuming. Often, loans on properties are sold, traded or grouped, such that keeping track of liens and potential defaults on properties under which a secondary lender would be entitled to some portion of foreclosure sale proceeds becomes a cumbersome administrative task.

When one lien holder initiates a foreclosure proceeding, the other lien holders may be notified. Notification by mail of the fact of foreclosure proceedings on a property may be the first and only indication of such proceedings intended to reach a secondary lien holder. Due to limited monitoring capability, a secondary lien holder may not learn of these foreclosure proceedings in a timely fashion and therefore may be unable to take appropriate measures to enforce its lien. Where the secondary lien holder is a corporation, internal delays within the corporation after receipt of the notification may likewise prevent the corporation from taking protective action. Also, notification by mail may be a problem because the address may not be current or valid.

In a typical scenario, while the mortgagor may be delinquent in making payments to a primary lender, secondary or junior lenders may still be receiving timely payments. Many secondary lenders do not begin researching potential foreclosure issues until there has been a substantial delinquency, e.g., 60 or 90 days, in repayment of their own loan. Thus, the secondary lender whose policy it is to begin researching at the onset of a 60 or 90 day delinquency may find that the primary lender has already initiated, or perhaps even resolved foreclosure proceedings on the property.

Therefore, there exists a problem in the industry whereby secondary lien holders often miss opportunities to collect on foreclosure proceeds after a first position or other position lender initiates foreclosure proceedings. The other lenders may know nothing about these proceedings or the potential distress event until after the foreclosure proceedings have occurred or until shortly before they have occurred. What is needed in the industry is an automated method and system for monitoring events associated with a loan that are symptomatic of properties at risk of foreclosure, well in advance of actual foreclosure.

SUMMARY

The present invention provides a method or system for monitoring loan activity and for reporting, based on the monitored activity, properties at risk of foreclosure in advance of foreclosure. Loan activity is monitored for the occurrence of a lien distress event, such as a delinquency, a delinquency duration, a delinquency frequency, a default, or commencement of foreclosure proceedings by a lien holder. Once a lien distress event occurs, notice of the event is forwarded to an interested lender. Additional data pertaining to the subject property, such as current property values, information on other lien holders, and potential for recovery may be reported along with the notice. This data may be used to help the lender prepare for foreclosure proceedings and to enable it to initiate appropriate measures to protect its lien.

A computer-based method of monitoring for and reporting of a lien distress event relatable to a property of interest within a client loan portfolio includes the steps of inputting property data from the client loan portfolio, standardizing the input property data into a form for use in querying a lien distress event database, and monitoring the lien distress event database for lien distress events relatable to the standardized property data. If a lien distress event relatable to the standardized property data is detected in the lien distress event database, a step of notifying the client of the lien distress event may be performed. The monitoring step may be performed periodically, and the client may specify the monitoring period as well as the type of lien distress event that may trigger a notification, e.g., a lien distress report delivered to the client.

The standardized property data may include property address or borrower identification data, and the lien distress event database may be a public records database or a credit reporting database. Lien distress events may include bankruptcy declarations, delinquent payments, defaults, negative credit reporting events, or foreclosures. A client may subscribe to a service that performs the method automatically, and the client may update the loan portfolio for monitoring.

A system may include a client station for inputting lender loan data for monitoring, an FTP server for uploading the lender loan data from the client station, and a mainframe server for accessing a lien distress event database. The mainframe server may use a data standardization module to standardize the lender loan data, a database search engine for searching the lien distress event database, and a report generating module for reporting to the client station via the FTP server lien distress events relating to the lender loan data.

Because a lender may need adequate time to prepare property valuations and to gather other relevant data about a property prior to participating in a foreclosure proceeding, providing advance notice of lien distress events to a lender is a valuable service. Therefore, a method and system are disclosed that enables lenders to quickly ascertain the status of a distressed property based on the occurrence of lien distress events. A lender may establish threshold values for a variety of metrics based on lien distress events, such that, for any property being monitored, the lender may receive a timely automated warning whenever a minimum threshold is exceeded.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

The present invention provides a method or system for monitoring for and reporting of lien distress events. When a lien distress event is detected, the present invention provides useful information to a lien holder well in advance of potential foreclosure proceedings. The information is then used to enable a lien holder to decide what course of action to take in response to the potential or actual lien distress event.

In a typical scenario, foreclosure proceedings on a property may be foreseeable based on the occurrence of events in advance of mortgagor default that are symptomatic of a property destined for foreclosure. Herein, such symptomatic events are termed lien distress events. One example of a lien distress event is a failure on the part of a mortgagor to make a timely payment on a first or second mortgage, i.e., a delinquency. A lender in a tertiary position who is receiving timely payments against its loan may be oblivious to this type of lien distress event if it is not also monitoring activity on the other mortgages. Another example of a lien distress event is a negative credit reporting event appearing on the credit history of a party named on the loan documents relating to the property. Another example of a lien distress event is a bankruptcy filing. Many other possible lien distress events may be defined based on metrics or statistics ascertainable from lien distress event databases, such as public records databases or credit reporting databases maintained by credit reporting agencies. Examples of public records databases may include title transfer records maintained by county governments. These may be accessed, for example, through a government website or through a subscription service such as Lexis-Nexis. Examples of credit reporting agencies may include Equifax, Experian, Trans Union, and Dun & Bradstreet. Examples of other lien distress events ascertainable as a metric or statistic from lien distress event databases may include a delinquency frequency, a delinquency trend (e.g., increasing lateness), a credit score, a credit score trend (e.g., rate of decline), a frequency of negative credit reporting events, a loan repayment default, etc., or some combination of any of the foregoing. Lien distress events indicative of a high-probability foreclosure may be determined empirically from various metrics or statistics based on case histories.

Figure 1:
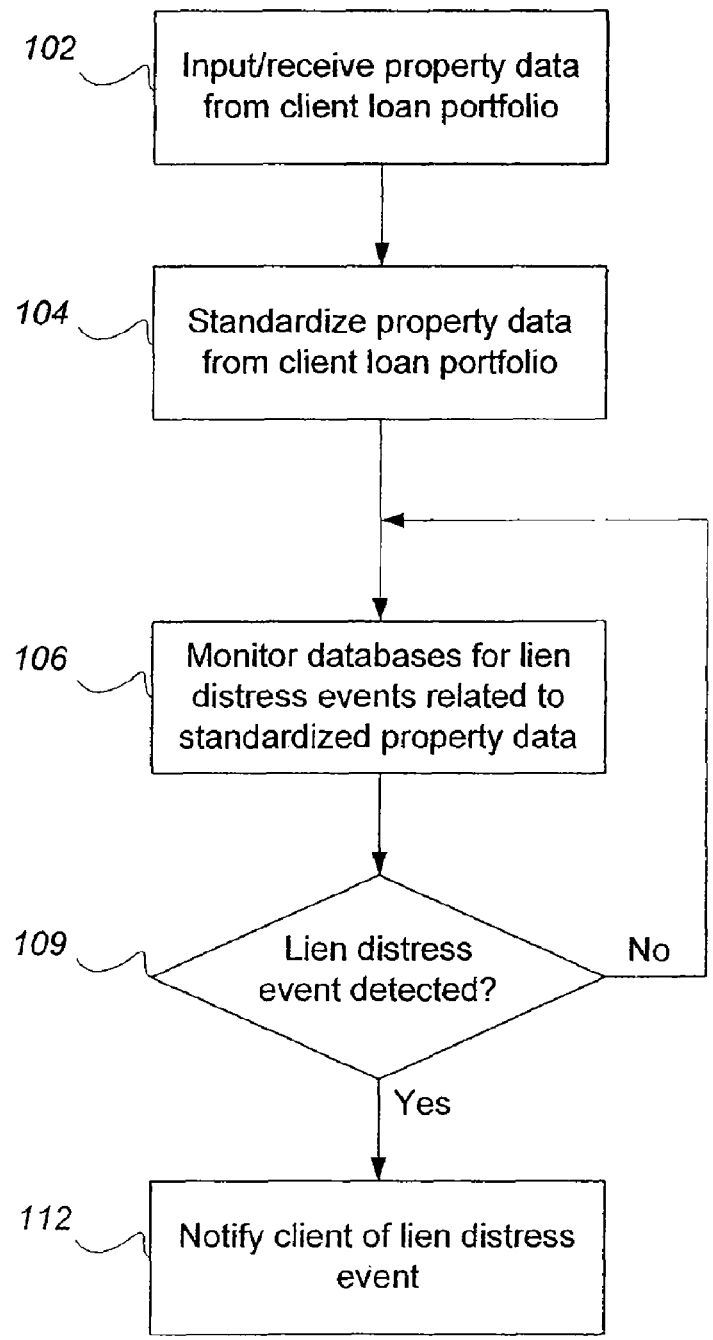
FIG. 1 is a flow chart depicting a method for monitoring for and reporting of lien distress events according to an embodiment of the present invention.

FIG. 1 is a flow chart depicting a method 100 for monitoring for and reporting of lien distress events. Method 100 may be executed as a series of automated instructions stored in memory as software, hardware, or combinations thereof, executable by a controller, processor, or processing device. Method 100 may be performed using a computer system, or using a network of computers, such that one step of method 100 may be performed by one computer, and another step of method 100 may be performed by another computer. Method 100 may describe steps performed automatically as a service for a subscriber or client.

Method 100 may begin with step 102. In step 102, data relating to properties may be input or received from a client loan database or portfolio. A client may be a lender or lien holder in possession of a portfolio of loans. The portfolio of loans may be represented by data pertaining to properties and mortgagors that correspond to each loan and each loan in the portfolio may be represented by a portion of the data. The portfolio may be stored, e.g., as electronic data in a database or information archive, where each loan corresponds to a record that may include a plurality of data fields, where each data field may be updated, and where each record may be accessed, retrieved, modified, saved, and appended with new fields. Thus, inputting property data from a client loan portfolio according to step 102 may include manually inputting data by a user interface, or automatically loading property data using software capable of accessing records in the portfolio.

In step 104, the property data input from step 102 may be standardized. Standardizing the property data may involve converting property data input from the client loan portfolio, as necessary, into a form acceptable for querying a lien distress event database. In one example, the standardization step may convert property data representing a street address into a form recognizable as a street address by the lien distress event database. In another example, the standardization step may convert property data representing a mortgagor identity into a form recognizable as a borrower name by the lien distress event database. Converting property data to a form of data recognizable by a lien distress event database may require reading the property data and reproducing the property data in a modified form. For example, the property data may be converted by rearranging the property data to a recognizable form, or by adding additional operators (e.g., ASCII characters) to the property data in a predetermined format. In another example, the property data may be converted by appending it as an argument within a predefined function. In another example, when property data has been previously matched to a record stored in a lien distress event database, converting the property data may include assigning a unique identifier to the property data to designate that it relates to a certain record stored in the lien distress event database.

Method 100 then proceeds to step 106. In step 106, one or more lien distress event databases may be monitored for lien distress events related or relatable to customized property data derived from a client loan portfolio. In one embodiment, step 106 monitors the lien distress event databases for any records containing the identity of the borrowers and/or the address of the subject property. The lien distress event databases are monitored to discover whether any lien distress events are listed in relation to the borrower identity or the address of the subject property. Note that a borrower identity may include a name, an alias, a social security number, a government identification number, or any other personal indicia. In one embodiment, monitoring step 106 may search the lien distress event databases for any negative credit reporting events, bankruptcy declarations, delinquent payments, defaults, or foreclosures associated with the property address or borrower identity. In other embodiments, monitoring step 106 may be performed using standardized data from step 104 continuously, periodically, or upon a demand by a client.

Next, decision step 109 may decide on appropriate action depending on whether a lien distress event is detected while monitoring the lien distress event databases. For each query associated with customized property data, as long as no lien distress event is detected, the method may loop back to step 106 to monitor the lien distress event databases again, according to the continuous, periodic, or on-demand monitoring frequency desired. When a lien distress event associated with customized property data is detected, the method may proceed to step 112. In step 112, the client may be promptly notified of the detected lien distress event. In one embodiment, notification in step 112 may include transmitting an electronic message to the client to alert the client of the lien distress event. In another embodiment, step 112 may include sending to a client a periodic report of lien distress events pertaining to all customized property data derived from the client's loan portfolio.

The method can monitor available databases to determine whether lien distress events indicative of potential foreclosure have occurred in advance of actual foreclosure, and if so, provide an early warning to a lien holder to enable the lien holder to take protective action. For example, by monitoring a credit reporting database, the method may detect and report a severe delinquency in a car payment. Even though the loan associated with the car payment is unrelated to any liens on real property under mortgage, the delinquency may indicate a mortgagor's potential inability to satisfy an upcoming payment on a home loan.

In another example, a method according to the invention may monitor a public record database for lien distress events. Any relevant public record data that may be relevant to, or indicative of property in distress, may be monitored and discovered. Relevant public record data may include data such as a notice of default or lis pendens, financing information, foreclosure information, a sale, and a change in title. Monitoring this type of data may provide an effective way to protect a junior lien holder from surprise delinquencies or defaults. Because of increased privacy concerns and shear volume of work, the data or information may not be readily available or obtainable for junior lien holders to monitor. This information may not be readily obtainable or practical for the junior lien holder to monitor with respect to every loan it services. The method may automate the monitoring and reporting process on behalf of a junior lender.

Figure 2:
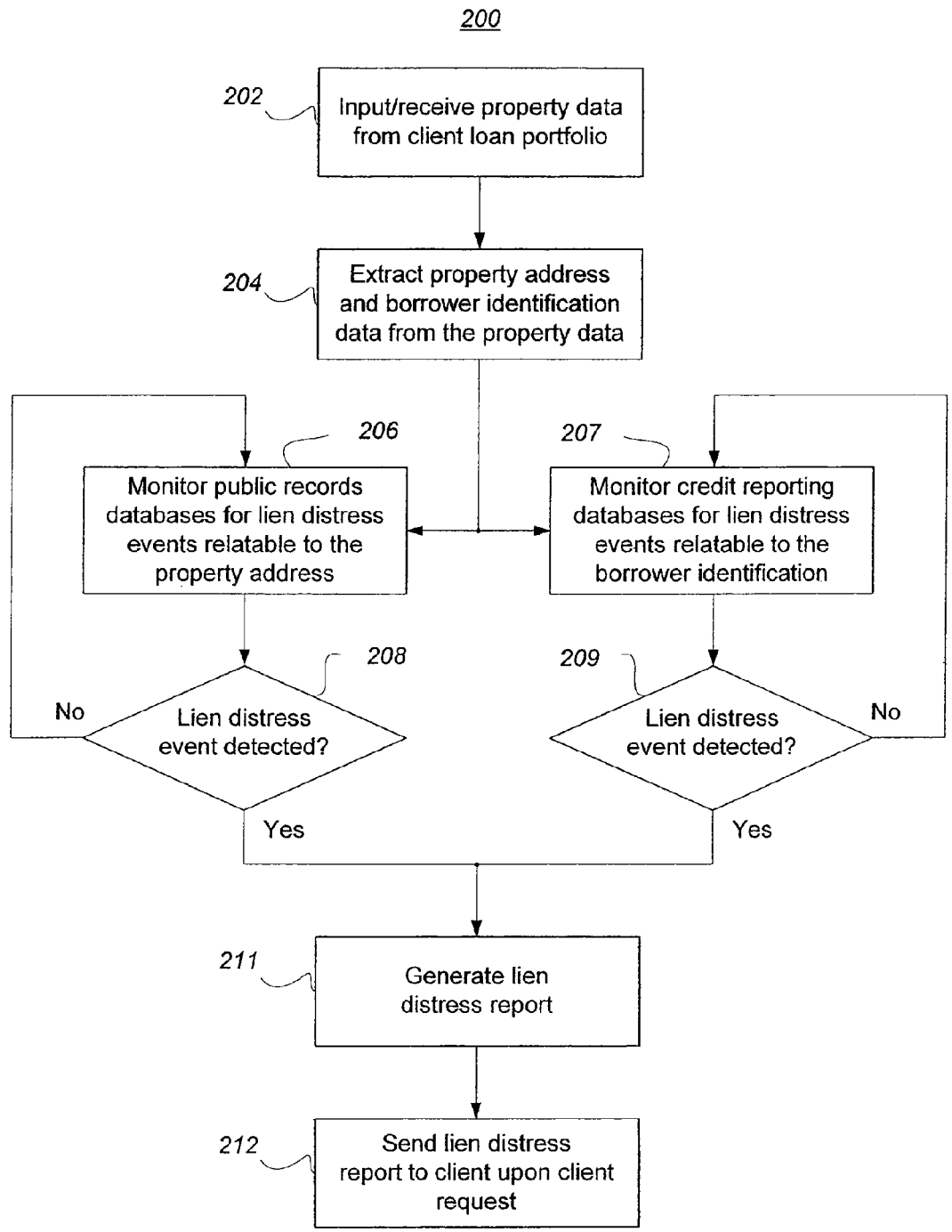
FIG. 2 is a flow chart depicting a method for monitoring for and reporting of lien distress events according to an embodiment of the present invention.

FIG. 2 is a flow chart depicting a method 200 for monitoring for and reporting of lien distress events. All or a portion of method 200 may be performed automatically as a service to a client, e.g., a lender or financial institution in possession of an extensive loan portfolio and in need of an automated service for monitoring property data associated with loans in the portfolio for the occurrence of lien distress events.

Step 202 may involve inputting or receiving property data from a client loan portfolio or a client loan database in a manner similar to that executed in the initial step of method 100. In the next step 204, the property address and the identity or identities of the owners of the subject property are extracted from the property data input in step 202. The extracting step 204 may also involve a data conversion to convert the property address and owner identity into a form recognizable as a property address and owner identity, respectively, by a lien distress event database. Alternatively, the extracting step 204 may involve copying that portion of the property address or owner identity needed to formulate an appropriate query to a lien distress event database. For example, step 202 may involve inputting property data from a client loan portfolio into an electronic database having a format compatible with software executed in extracting step 204. In this example, in the extracting step, only the property address and owner identity data may be extracted from the electronic database in extracting step 204, while any extraneous information contained in the electronic database (for example, information related to the database structure) may not be extracted.

The method may proceed into one or more processing steps according to the number or type of lien distress event database selected for monitoring. In the embodiment of method 200, two processing steps 206 and 207 are shown. These two steps are shown for purposes of illustration only, and are not intended to limit the present invention to merely two steps. A method according to the invention may employ one or more processing steps as needed or desired.

In step 206, one or more lien distress event databases containing public records may be monitored for lien distress events related or relatable to the subject property. During this monitoring step, property address and property owner identity data extracted in step 204 may be used to formulate appropriate search criteria for detecting a lien distress event. In the decision block of step 208, if a lien distress event is not detected, the method loops back to step 206 to continue the monitoring process. Continuation of the monitoring step may occur according to a frequency specified by a client. In one embodiment, continuation of the monitoring step may be performed according to a default frequency of once per day.

In addition to the performance of steps 206 and 208, steps 207 and 209 may be performed. In step 207, one or more lien distress event databases containing credit reporting events may be monitored for lien distress events. Preferably, during this monitoring step, property owner identity data extracted in step 204 may be used to formulate appropriate search criteria for detecting a lien distress event. In other embodiments, property address data may also be used during this monitoring step. In step 209, if a lien distress event is not detected, the method loops back to step 207 to continue the monitoring process according to a selected or default frequency.

In either step 208 or 209, if a lien distress event is detected during a monitoring step, method 200 proceeds to step 211. In step 211, a lien distress report is generated. In one embodiment, the lien distress report may be maintained in an electronic memory. In another embodiment, the lien distress report may be maintained in an electronic memory and updated with additional lien distress event information as that information becomes available in the course of continued monitoring of lien distress event databases. In another embodiment, step 211 may include printing a hard copy of the lien distress report.

In step 212, the lien distress report may be delivered to a client upon receiving a client request. By withholding the lien distress report until receiving a client request, the lien distress report may be updated over a selected time period, and may be updated with information pertaining to many properties extracted from a client loan portfolio. The lien distress report in the form of a hard copy may be delivered to a client by mailing, or the lien distress report may be delivered to a client electronically by any number of methods known in the art. Alternatively, the lien distress report may be automatically and electronically delivered to a client immediately after the lien distress event has been detected. The occurrence of the lien distress event may trigger the system to automatically send the lien distress report to the client.

A lien distress report may include data reporting the fact of a lien distress event, as well as the property address and the identity or identities of the property owners. A lien distress report may also include additional data pertaining to the subject property. For example, data retrievable from a public records database may be used to create an automated valuation of the subject property, and the valuation may be included in the lien distress report. An automated valuation may be helpful in allowing a client to determine the extent to which a particular lien may be covered by the current value of the property. Other data included in a lien distress report may be retrieved directly from a credit reporting database, public records database, or other source of information relevant to the property, to a lien on the property, to a loan on the property, or to the owner or owners of the property. Additional data on a lien distress report may include any foreclosure rescissions, final judgments, transactions involving the property, lien amounts, and contact information for other lenders. Tax delinquency data may also be sent along with a lien distress report. Tax delinquency may affect the total value of the property attainable should foreclosure of a loan be necessary. Also, if relevant, a complete or partial credit history of the owner or owners may be provided as part of the lien distress report.

The data selected for inclusion on a lien distress report may be gathered in generation step 211 and sent to a client in step 212 as a lien distress report indicating the lien distress event or events that triggered generation of the report. The lien distress report is intended as a beneficial early warning device to alert a lender, who may then use the report as starting point for further research on the property and the lien distress event. The report may thus serve as an excellent jump-start to the research process prior to actual default or foreclosure proceedings initiated by another lien holder. The report may significantly lessen the time required to research the property and any other liens associated with it, and assist a client in determining whether foreclosure may be imminent. In one embodiment, lien distress reports may be generated daily for each property being monitored for which there is a lien distress event.

In another embodiment, the lien distress report and related data may not be sent to the lien holder directly, but may be made available to a client by allowing the client to download the report from a server accessible over a network. In this case, a notification of a distress event may be sent directly to a client. The notification may be sent concurrently with detection of the lien distress event, concurrently with generation of the lien distress report, or after the lien distress report is available. In one embodiment, the lien distress report and related data may be made accessible to the lien holder using a File Transfer Protocol (FTP) client. In another embodiment, lien distress reports may be generated periodically and uploaded to an FTP server. Alternative time-frames may be used in different embodiments of the invention. The client may then access uploaded reports using standard FTP client software and a login. In another embodiment, secure encryption may be used during a login and file-transfer process.

Figure 3:
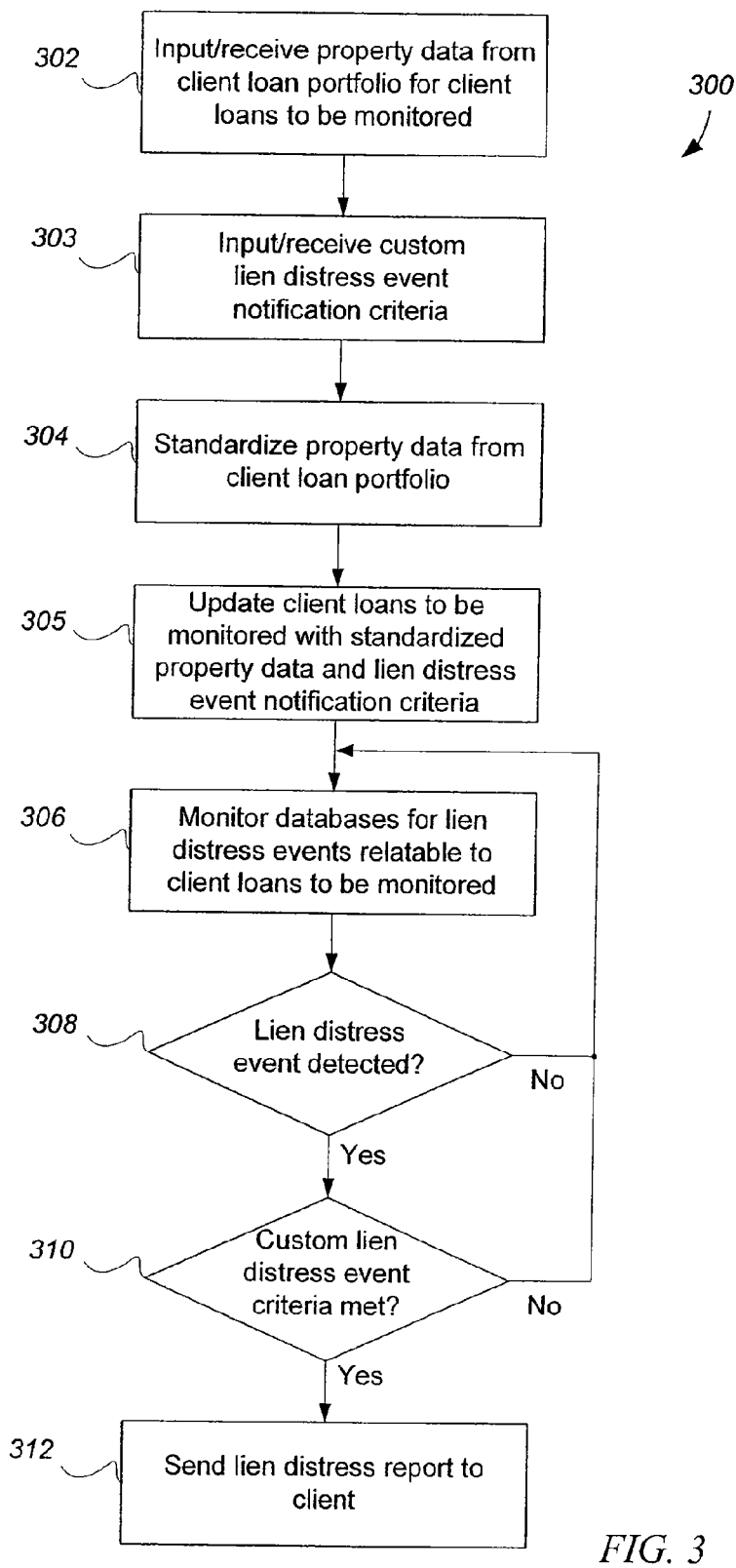
FIG. 3 is a flow chart depicting a method for monitoring for lien distress events and for reporting the events according to client notification criteria according to an embodiment of the present invention.

FIG. 3 is a flow chart depicting a method 300 for monitoring for and reporting of lien distress events. All or a portion of this method 300 may be implemented as a service to a client in need of automated lien distress event monitoring and reporting. In step 302, property data is input from a client loan portfolio, as in previous embodiments. Then, in step 303, a client may input custom lien distress event notification criteria. This allows a client to select one or more specific types of lien distress events which, if detected, may trigger a lien distress event notification. For example, a client may be interested in learning whether a property has gone into foreclosure. In that case, the client may specify in step 303 that the client be notified of lien distress events that indicate actual foreclosures on properties included within the client loan portfolio. In another example, a client may specify a threshold value in step 303, such that the client be notified of lien distress events that indicate monthly payment delinquencies in excess of the threshold. In other examples, lien distress events thresholds such as a 60 or 90 day delinquency on a loan may be specified in step 303, or lien distress events such as an owner bankruptcy, or an event indicating a transfer of property may be specified in step 303 as criteria for triggering notification of the lien distress event. Any detectable lien distress event, or any combination of detectable lien distress events, can form a client's lien distress event notification criteria input in step 303. Furthermore, a client may establish threshold values based on statistics derivable from the occurrence of lien distress events. Examples of derivable statistics may include an average delinquency duration, an average number of delinquent payments in a given time period, a rate of increasing delinquencies, a rate of increasing indebtedness, an average number of credit inquiries per month, a frequency of liens filed on properties associated with a borrower name, and so on. Those well versed in statistics should recognize that the scope of statistics based on lien distress events is potentially unlimited.

The next steps in method 300 may include a standardization step 304, a monitoring step 306, and a decision block 308. These steps are similar to corresponding steps described in preceding embodiments. If a lien distress event is not detected in decision block 308, the method loops back to step 306. If a lien distress event is detected in decision block 308, the method proceeds to another decision block 310. In decision block 310, the method determines whether the detected lien distress event satisfies criteria input by the client in step 303. If not, the method loops back to step 306. If so, the method proceeds to step 312. In step 312, a notification in the form of a lien distress report is sent to the client. The contents of a lien distress report may include the triggering event, relevant property and ownership data, and any other relevant data as previously described.

In another embodiment, a step (not shown) may be included after step 310 for generating a lien distress report, and then step 312 may be performed upon receiving a client request for the report. In still another embodiment, a client may customize the contents of a lien distress report by specifying, in a preliminary step, the type of information to be provided in a lien distress report. For example, a client may specify in input step 303 that a lien distress report include an updated credit history of the property owner. Then, the lien distress report delivered to the client in step 312 may be customized according to the client's specifications. In other embodiments, the client may specify monitoring frequency for lien distress events, and also delivery options for the lien distress report.

Figure 4:
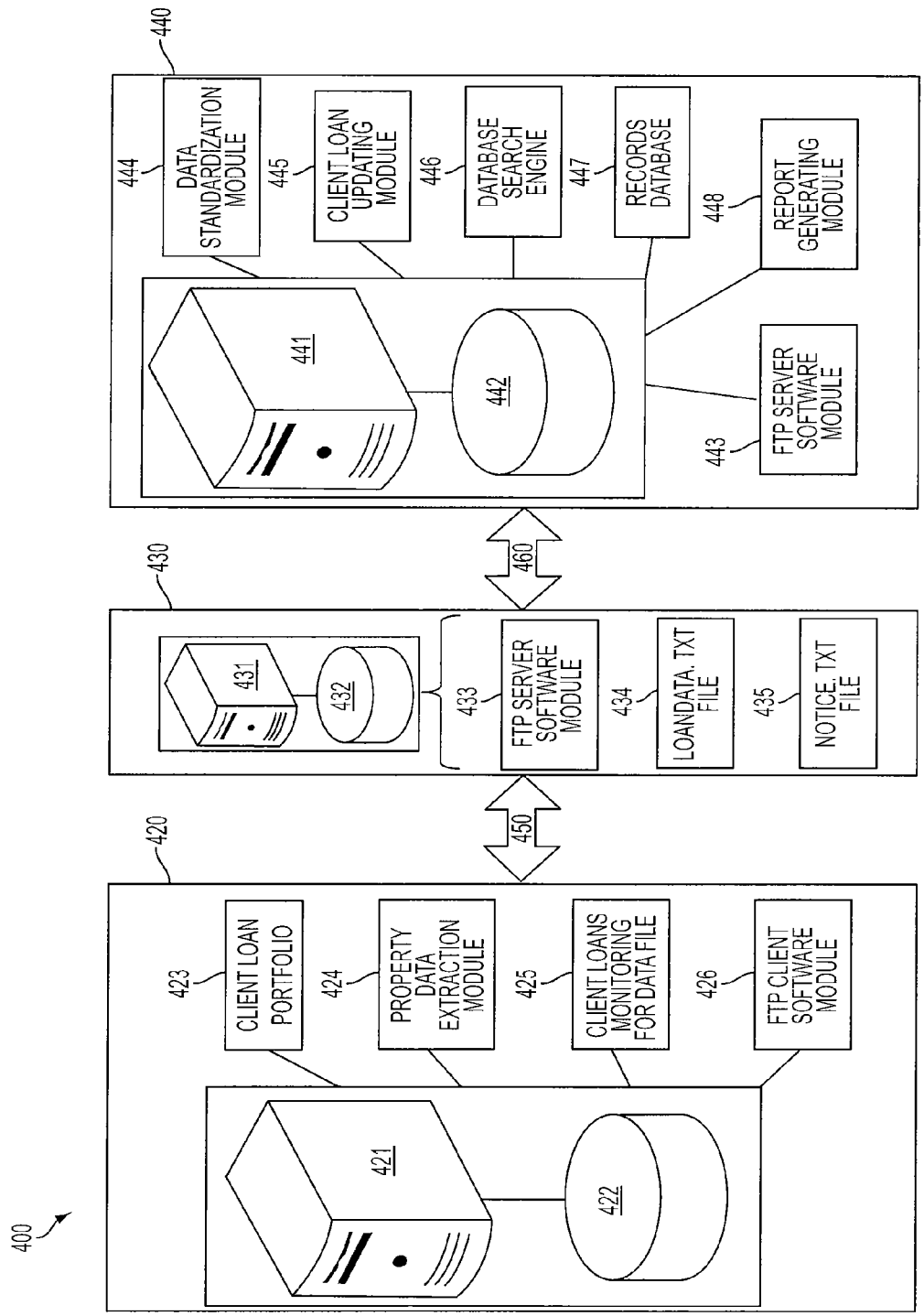
FIG. 4 is a system for monitoring for and reporting of lien distress events according to an embodiment of the present invention.

FIG. 4 is a system 400 for monitoring for and reporting of lien distress events according to an embodiment of the present invention. Any of the foregoing methods of the invention may be executed as a series of process steps using hardware and/or software modules shown in FIG. 4.

FIG. 4 may include three subsystems. The first subsystem may include one or more client stations 420. For simplicity, only one such client station is depicted in the figure, although other embodiments are possible which include any number of client stations. The second subsystem may include a file transfer protocol (FTP) server 430. The third subsystem may include a mainframe server 440. In one embodiment, mainframe server 440 may include a mainframe computer that also may include, or has access to, one or more lien distress event databases. Client station 420 may communicate with FTP server 430 via a network link 450. FTP server 430 may communicate with mainframe server 440 via a network link 460. Network links 450 and 460 may be separate local area network links or wide area network links, and may connect a plurality of client computers, FTP servers, and mainframe servers in any conventional configuration such as bus, star, or ring. In another embodiment, network links 450 and 460 may represent the same network, such as a local or wide area network or the Internet.

A client station 420 may include a computer 421 linked to a memory 422. In one embodiment, computer 421 may operate on a conventional platform designed for personal computers such as Windows, LINUX or Macintosh. Memory 422 may be any computer readable memory such as a hard disc, floppy disc, RAM, ROM, EEPROM, CD-ROM, flash memory, or other internal or external optical, magnetic, or solid-state device, or any combination of the foregoing. In one embodiment, memory 422 may include a client loan portfolio 423, a property data extraction module 424, a client loans for monitoring database 425, and an FTP client software module 426. In another embodiment, each of the client loan portfolio 423, the property data extraction module 424, the client loans for monitoring database 425, and the FTP client software module 426 may be accessed or executed by computer 421.

Client loan portfolio 423 may be a database or other archival storage medium or software module for inputting, updating, and saving electronic data. In one embodiment, a client may be a lender or lien holder, and client loan portfolio 423 may contain data associated with a plurality of the client's loans. Data stored on client loan portfolio 423 may include records associated with each loan in the portfolio. Each record may contain information for each loan such as a property address and borrower identification, and may include a variety of additional information associated with the loan or the property such as seller identity, property descriptions, appraisal information, selling price, loan amount, loan number, contractual terms, effective dates, insurance information, property tax information, closing statements, etc.

Property data extraction module 424 may be an application that allows a client to identify which records, i.e., which loans, from its client loan portfolio the client wishes to select for lien distress event monitoring. Property data extraction module 424 may allow the client to extract key information from selected loans, and write the key information to client loans for monitoring data file 425, which may be a database, a spreadsheet, a text file, or another type of data file. Key information written to client loans for monitoring data file may be a minimum amount of information needed to perform lien distress event monitoring for one or more loans from client loan portfolio 423. One example of key information is property address data for each selected loan. Another example of key information is borrower identification data for each selected loan. Another example may be any combination of data extractable from client loan portfolio associated with a single loan. In one embodiment, key information extracted to client loans for monitoring data file 425 may be written to a text file using specified numbers of characters for each property and for other property data associated with each property.

Once the client loans for monitoring data file 425 is created, it may be uploaded to FTP server 430 using FTP client software module 426. FTP client software module 426 may be any appropriate FTP client software for initiating communication with an FTP server 430 for the purpose of exchanging or transmitting electronic files via network link 450. FTP client software module 426 may enable computer 421 to perform file manipulation operations such as uploading files, downloading files, and reading from or writing to files on a server or another computer connected to network link 450. In one embodiment, FTP client software module communicates using TCP/IP protocol.

FTP server 430 may upload client loans for monitoring data file 425 via network link 450 and store it locally. In one embodiment, FTP server 430 may include a computer 431 coupled to a memory 432. Computer 431 and memory 432 may be similar to computer 421 and memory 422 of client station 420. In one embodiment, computer 431 may function as an application server dedicated to providing lien distress event monitoring and reporting services to one or more client stations 420. In another embodiment, computer 431 and memory 432 may form an enterprise server such as a Sun Microsystems computer running a UNIX-based Solaris or Linux operating system, or a Hewlett-Packard (HP) computer running a Microsoft Windows operating system, or an IBM computer running an iSeries operating system, or equivalent.

FTP server 430 may store a local file version of client loans for monitoring data file 425 in the same or similar format used on client station 420. Alternatively, it may store the information contained in client loans for monitoring data file 425 in a different format. One example format for this information stored in memory 432 is a text file, labeled in the figure as Loandata.txt file 434. In one embodiment, the information from client loans for monitoring data file 425 may be written as Loandata.txt file 434 to FTP server 430 using a Secure Socket Layer (SSL) encryption. Loandata.txt file 434 may list key information in a character delimited or space delimited file. An FTP server software module 433 enables uploading and downloading of files to and from FTP server 430 via network links 450 and 460.

Any of the methods according to the present invention may be implemented through interaction between FTP server 430 and mainframe server 440. Mainframe server 440 may be any computer or computer system capable of serving a plurality of users simultaneously and performing bulk data processing requests for public records and/or consumer statistics and information. The hardware of mainframe server 440 is represented in the figure as computer 441. Computer 441 is coupled to a memory 442, which may any type of memory or combination of memory devices known in the art. Memory 442 contains operating system software, software modules, applications, and data executable and/or accessible by computer 441. FTP server software module 443 accessible by computer 441 enables uploading and downloading of files to and from mainframe server 440 via network link 460.

Client loan information to be monitored for lien distress events contained on FTP server 430 in a file such as Loandata.txt file 434 may be downloaded to mainframe server 440 via network link 460. In an embodiment using SSL, Loandata.txt file 434 may be encrypted by FTP server 430 prior to transmission, and decrypted by mainframe server 440 after receipt. Once downloaded, and (if necessary) decrypted, computer 441 may execute data standardization module 444 to re-form key information associated with the client loans into a standardized format that is readable by a database search engine 446. The key information, now in standardized format, may be stored in a client loans updating module 445.

Client loans updating module 445 may be created upon an initial downloading (or receipt) of client loan information from a particular client. There may be one client loans updating module 445 for each client using mainframe server 440 for lien distress event monitoring. If a client loans updating module 445 has been previously established for a client when a subsequent downloading of client loan information for the same client is standardized by data standardization module 444, the client loans updating module 445 may be updated with the new information. In this way, a mainframe server 440 can maintain up-to-date representation of a loan portfolio for each client that it serves.

Database search engine 446 monitors or searches for lien distress events associated with a client loan portfolio by querying a records database 447. The contents of a query may use key information retrievable from client loans updating module 445. A query may be presented to records database 447 in such a way that records database 447 may return a lien distress events when key information (e.g., property address or borrower identification) or other standardized client loan information matches information associated with the lien distress event recorded in records database 447. Records database 447 may include one or more of public records databases (e.g., transaction databases or property databases), credit reporting databases, property information databases, or consumer information databases. Records database 447 may be queried in this manner according to a predetermined frequency, or periodically as specified by a client.

While monitoring for lien distress events, whenever a lien distress event is detected that relates to a loan in a client loan portfolio, computer 441 may initiate notification of the lien distress event in the form of an electronic communication transmitted to the client over network link 460. FTP server software module 443 may be used to effect this communication. In addition, computer 441 may execute report generating module 448, which creates a report listing the lien distress events detected in records database 447. The report may include information describing one or more lien distress events, the property or properties associated with the lien distress events, borrower identification, and other information associated with the property or borrowers. For example, a property valuation summary retrieved from records database 447 may be included in the report. In one embodiment, the report may be saved as a text file, and the text file may be character or space delimited. The report may be stored in memory 442, encrypted, and/or transmitted using SSL (if necessary) as a form of notification to a client via network link 460 by computer 441 using FTP server software module 443. When uploaded to FTP server 430, the report may be saved in memory 432. In one embodiment, the report may be saved in memory 432 on FTP server 430 as Notice.txt file 435.

A client may then retrieve the report by downloading Notice.txt file 435 from FTP server 430 using SSL (if necessary), and the appropriate FTP client and server software modules. Using appropriate software, computer 421 may convert Notice.txt file 435 into a form readable by a client, for example, by displaying the text or printing a hard copy. Notice.txt file 435 may be saved in memory 426 for later review. The client may thus be apprised of any lien distress events affecting property associated with loans in the client loan portfolio 423. Client station 420 may also update loan records in client loan portfolio 423 with lien distress event information received in Notice.txt file 435.

In alternative embodiments, a plurality of records databases may be monitored, and a lien distress report may be generated for each, or one report may be generated based on information retrieved from more than one records database. Additionally, in alternative embodiments, lien distress reports may be generated periodically regardless of the occurrence of any lien distress event.

The invention has been disclosed in an illustrative style. Accordingly, the terminology employed throughout should be read in an exemplary rather than a limiting manner. Although minor modifications of the present invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method of monitoring for and reporting of a lien distress event relatable to a lien against a property, comprising:
    extracting, using a processor, loan data from a client loan portfolio;
    defining, using the processor, the lien distress event relatable to the loan data by using one or more lien distress event criterion;
    iteratively detecting, using the processor, a property database and a credit reporting database for an occurrence of the lien distress event; and
    notifying, using the processor, a client of the occurrence of the lien distress event.

2. The method of claim 1, wherein the loan data comprises borrower identification data, property data, or combinations thereof.

3. The method of claim 1, wherein the one or more lien distress event criterion comprise a loan repayment default status, a property foreclosure status, a monthly payment delinquency status, a monthly payment delinquency trend, a borrower credit score, a borrower credit trend, a borrower bankruptcy status, a property transfer status, or combinations thereof.

4. The method of claim 1, wherein the detecting comprises:
    retrieving, using a processor, updated data from a lien distress event database; and
    comparing, using the processor, the one or more lien distress event criterion with the updated data.

5. The method of claim 4, wherein the lien distress event database comprises a public record database, a credit reporting database, or combinations thereof, and wherein the lien distress event database is updated periodically to reflect changes pertinent to the loan data.

6. The method of claim 1, wherein the detecting comprises counting, using the processor, a number of the occurrences of the lien distress event.

7. The method of claim 6, wherein the one or more lien distress event criterion comprise a threshold value for the number of occurrences of the lien distress event.

8. The method of claim 1, wherein the defining comprises selecting, using the processor, at least one lien stress event criterion or setting a threshold value for at least one lien stress event criterion.

9. The method of claim 1, wherein the notifying comprises:
generating, using the processor, a lien distress report that records the occurrence of the lien distress event; and
sending, using the processor, the lien distress report to the client.

10. A computer-based method of monitoring for and reporting of a lien distress event relatable to a lien against a property, comprising:
receiving, using a processor, loan data from a client holding the lien;
defining, using the processor, one or more lien distress event criterion;
iteratively monitoring, using the processor, a property database and a credit reporting database for lien distress events based on the one or more lien distress event criterion; and
reporting, using the processor, a result of the monitoring to the client holding the lien.

11. The method of claim 10, wherein the loan data comprises property data and borrower data relatable to the lien.

12. The method of claim 11, wherein the property database records and updates transactions relatable to the property data, and wherein the credit reporting database records and updates events relatable to the borrower data.

13. The method of claim 10, wherein the monitoring comprises:
detecting, using the processor, updated records from the property and the credit reporting databases relatable to the loan data;
analyzing, using the processor, the updated records based on the one or more lien distress event criterion; and
ascertaining, using the processor, an occurrence of the lien distress event.

14. The method of claim 13, wherein the reporting takes place only after ascertaining the occurrence of the lien distress event.

15. The method of claim 13, wherein the reporting comprises:
generating, using the processor, a lien distress event document recording the result of each monitoring; and
notifying, using the processor, the client about the lien distress event document.

16. The method of claim 10, wherein the one or more lien distress event criterion comprise a loan repayment default status, a property foreclosure status, a monthly payment delinquency status, a monthly payment delinquency trend, a borrower credit score, a borrower credit trend, a borrower bankruptcy status, a property transfer status, or combinations thereof.

17. A system for monitoring for and reporting of lien distress events relatable to lender loans on a property, comprising:
a client device for receiving a client loan portfolio, extracting client loan data from the client loan portfolio, and receiving one or more lien distress event criterion;
a first server having:
a data standardization module for standardizing the client loan data;
a database search engine for iteratively searching a property database and a credit reporting database for records that match the standardize client loan data and satisfy the one or more lien distress event criterion; and
a reporting module for generating a search report of the database search engine and notifying the client device after the search report is ready; and
a second server coupled between the client device and the first server via a network, configured to transmit the client loan data and the one or more lien distress event criterion from the client device to the first server, and configured to transmit the search report from the first server to the client device.

18. The system of claim 17, wherein the client loan data comprises property data pertinent to the property and borrower data pertinent to a borrower of the loans.

19. The system of claim 17, wherein the first server further comprises a client loans updating module for updating the client loan data.

20. The system of claim 17, wherein the client loan data and the search report are stored temporarily in the second server.

21. The system of claim 17, wherein the one or more lien distress event criterion comprise a loan repayment default status, a property foreclosure status, a monthly payment delinquency status, a monthly payment delinquency trend, a borrower credit score, a borrower credit trend, a borrower bankruptcy status, a property transfer status, or combinations thereof.

22. A computer-based method of monitoring for and reporting of a lien distress event relatable to a property, comprising:
receiving, using a processor, loan data from a client loan portfolio and one or more lien stress event criterion from a client;
automatically monitoring, using the processor, a property database and a credit reporting database for lien distress events defined by the one or more lien stress event criterion;
generating, using the processor, a lien stress event report based on the automatically monitoring; and
storing, using a memory, the lien stress event report.

* * * * *